UNITED STATES PATENT OFFICE.

FRIEDRICH VON BOLZANO, OF HÖCHST-ON-THE-MAIN, GERMANY, ASSIGNOR TO FARBWERKE, VORM. MEISTER, LUCIUS & BRÜNING, OF HÖCHST-ON-THE-MAIN, GERMANY, A CORPORATION.

PROCESS OF MAKING FORMYLMETHYLANTHRANILIC ACID.

SPECIFICATION forming part of Letters Patent No. 712,246, dated October 28, 1902.

Application filed May 13, 1902. Serial No. 107,072. (No specimens.)

*To all whom it may concern:*

Be it known that I, FRIEDRICH VON BOLZANO, Ph. D., a citizen of the Empire of Austria-Hungary, residing at Höchst-on-the-Main, Germany, have invented certain new and useful Improvements in the Manufacture of Formylmethylanthranilic Acid, of which the following is a specification.

I have found that methohalids of quinolin, especially chlormethylate of quinolin and brommethylate of quinolin, yield on oxidation in an alkaline or basic solution formylmethylanthranilic acid according to the following equation:

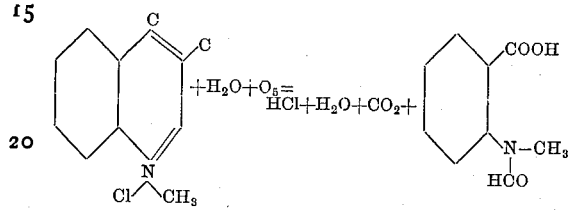

The oxidation occurs in an aqueous solution with manganates or permanganates of alkalies or alkaline earths. To obtain good yields, it is preferable to neutralize the free alkali and alkali carbonate formed on oxidation. This is effected by successively adding to the liquid undergoing oxidation an acid or, better, magnesium sulfate.

My invention relates to the manufacture of formylmethylanthranilic acid by the foregoing oxidation.

The following example illustrates the process: One hundred kilos of chlormethylate of quinolin or the equivalent proportion of brommethylate of quinolin and one hundred and eighty-five kilos of crystallized magnesium sulfate are dissolved together in water. Into this solution is run with rapid stirring a cold saturated solution of two hundred and ninety-five kilos of potassium permanganate or the equivalent proportion of another permanganate or manganate. The oxidation being completed, the precipitated manganese oxid and magnesium hydroxid are filtered. The filtrate is treated with sixty to sixty-five kilos of hydrochloric acid of 20° Baumé specific gravity and concentrated at water-bath temperature. On cooling formylmethylanthranilic acid crystallizes.

In the above example the magnesium sulfate may be omitted; but it will then be necessary to add more hydrochloric acid, about one hundred and forty to one hundred and forty-five kilos of 20° Baumé specific gravity, to the liquid filtered from the manganese. The yield of formylmethylanthranilic acid by the second method is generally somewhat inferior.

The formylmethylanthranilic acid crystallizes from water in feebly-yellowish prisms having the odor of coumarin and melting at 167° centigrade. It is readily soluble in alcohol, little soluble in cold but more abundantly in hot water. When boiled with dilute alkalies, formylmethylanthranilic acid loses its formyl group and yields the well-known methylanthranilic acid, which melts at 177° centigrade.

Formylmethylanthranilic acid may serve as parent material for the manufacture of indigo.

Having now described my invention, what I claim is—

The herein-described process of making formylmethylanthranilic acid, which consists in oxidizing halogenmethylates of quinolin in an aqueous solution, substantially as set forth.

In testimony that I claim the foregoing as my invention I have signed my name in presence of two subscribing witnesses.

FRIEDRICH VON BOLZANO.

Witnesses:
ALFRED BRISBOIS,
JOHANN HARTENSTEIN.